Oct. 8, 1968   R. B. THORN ET AL   3,404,521
FRUIT HARVESTING APPARATUS
Filed June 16, 1966   6 Sheets-Sheet 3
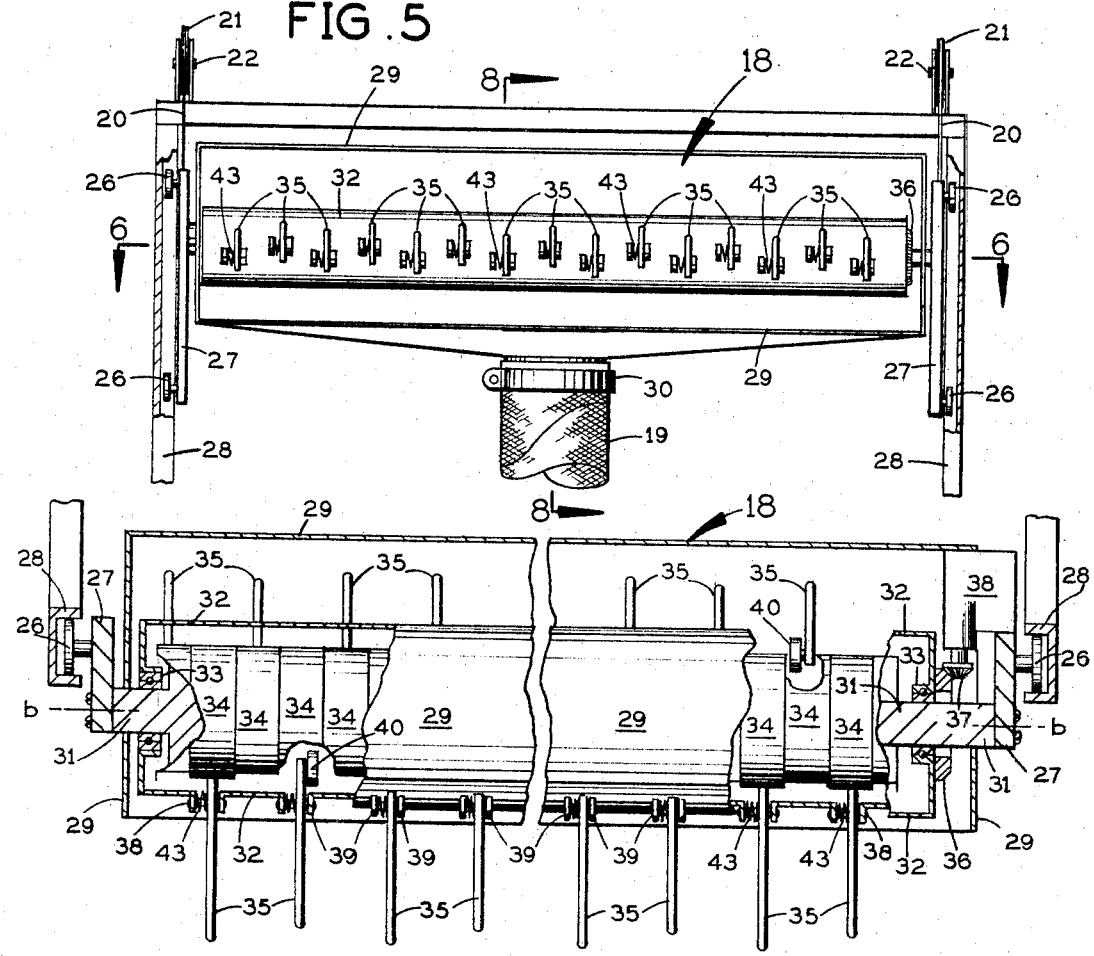
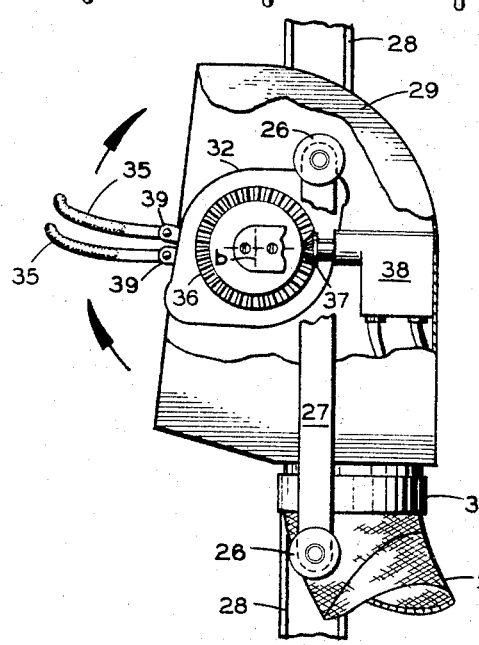
INVENTORS
ROY B. THORN
JACK L. GRAY
BY
Lloyd J Andres Oct. 8, 1968   R. B. THORN ET AL   3,404,521
FRUIT HARVESTING APPARATUS
Filed June 16, 1966   6 Sheets-Sheet 4

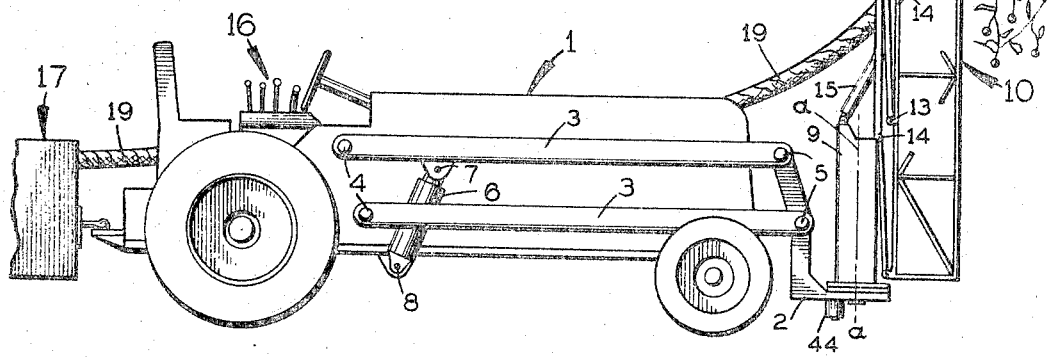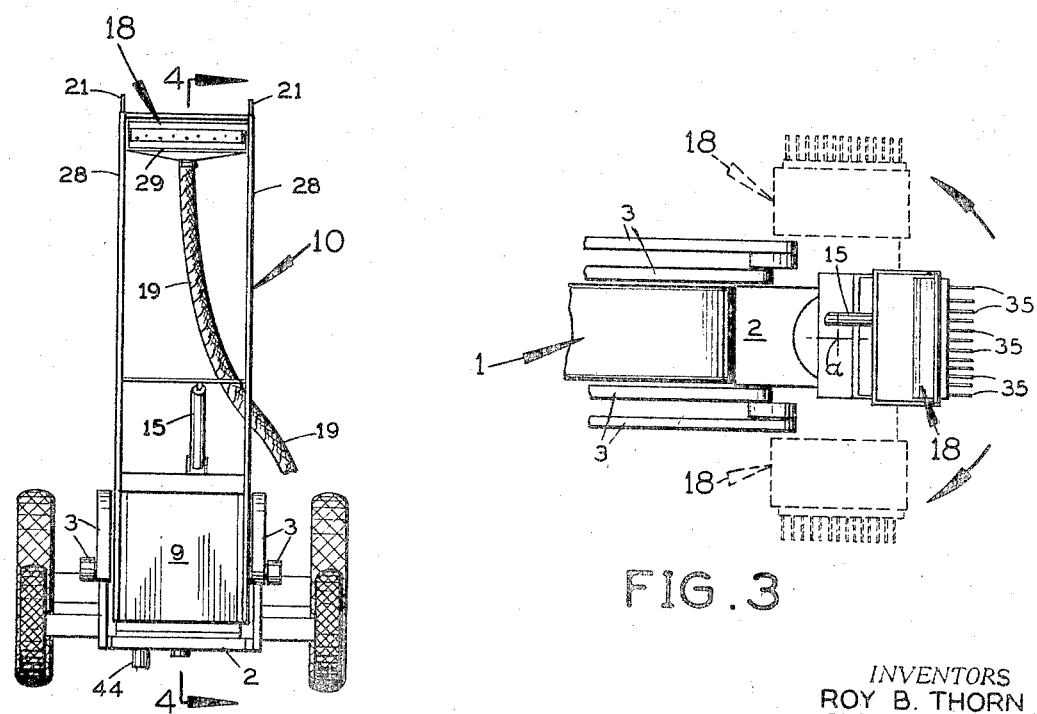

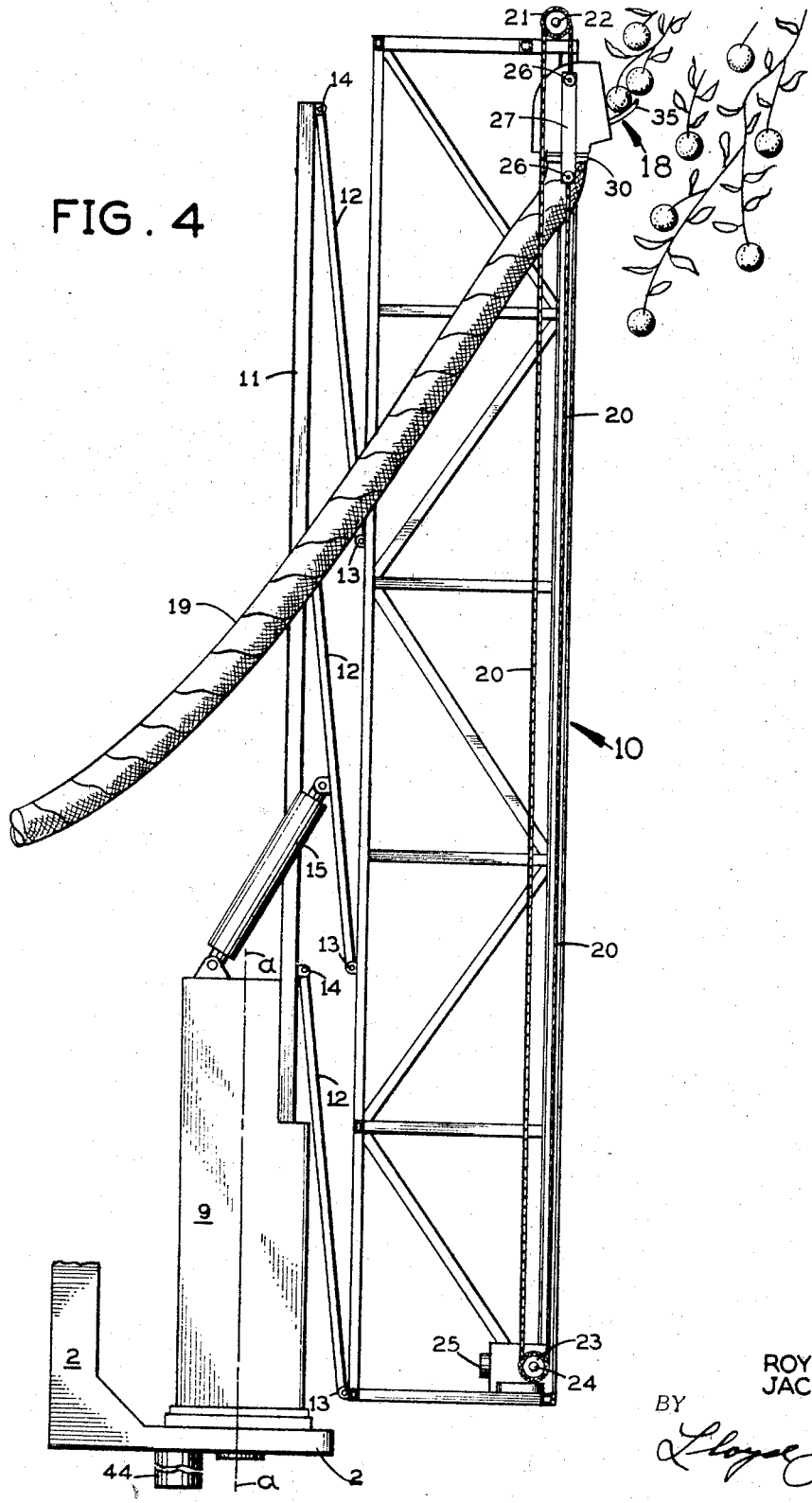

INVENTORS
ROY B. THORN
JACK L. GRAY
BY
Lloyd Sanders

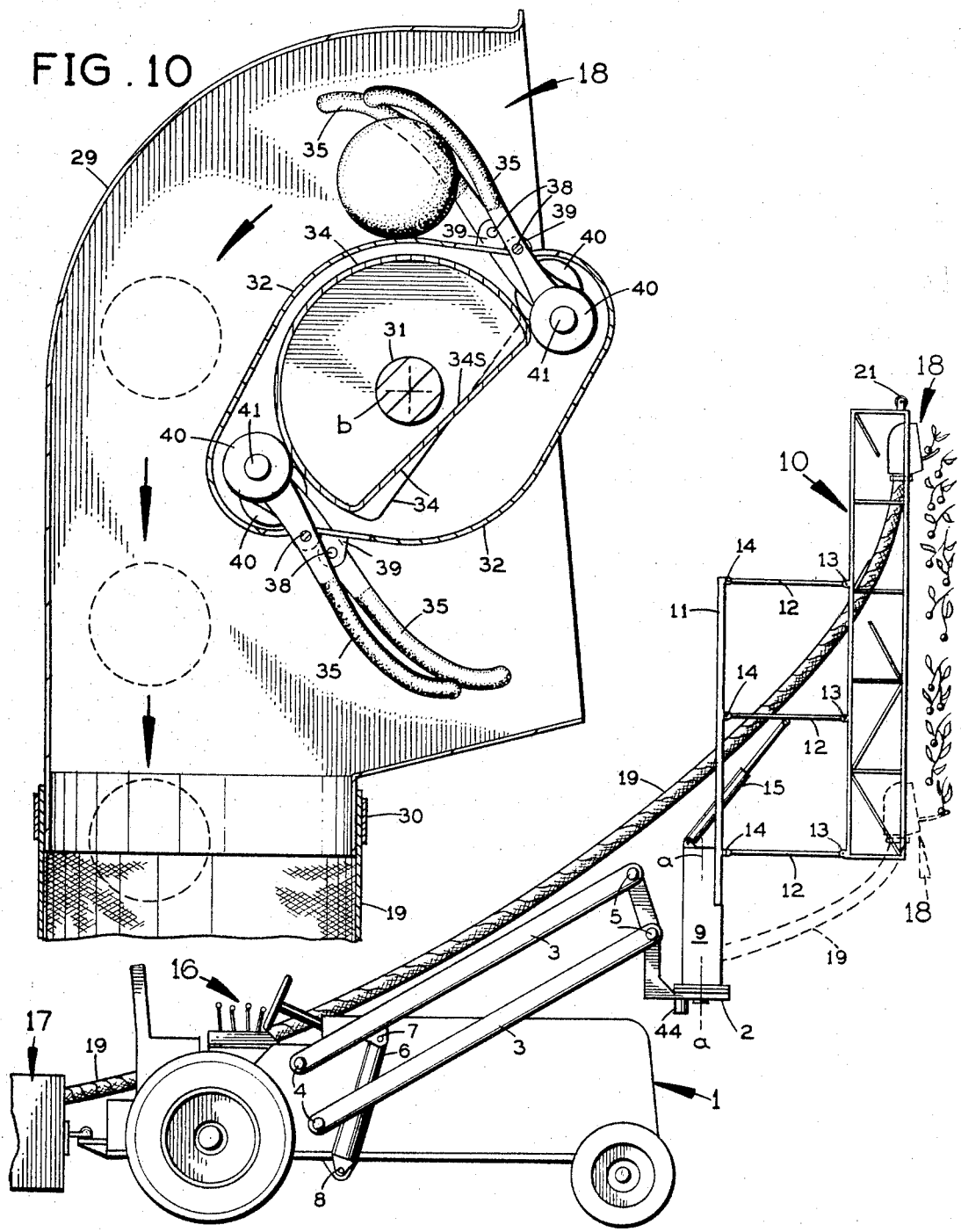

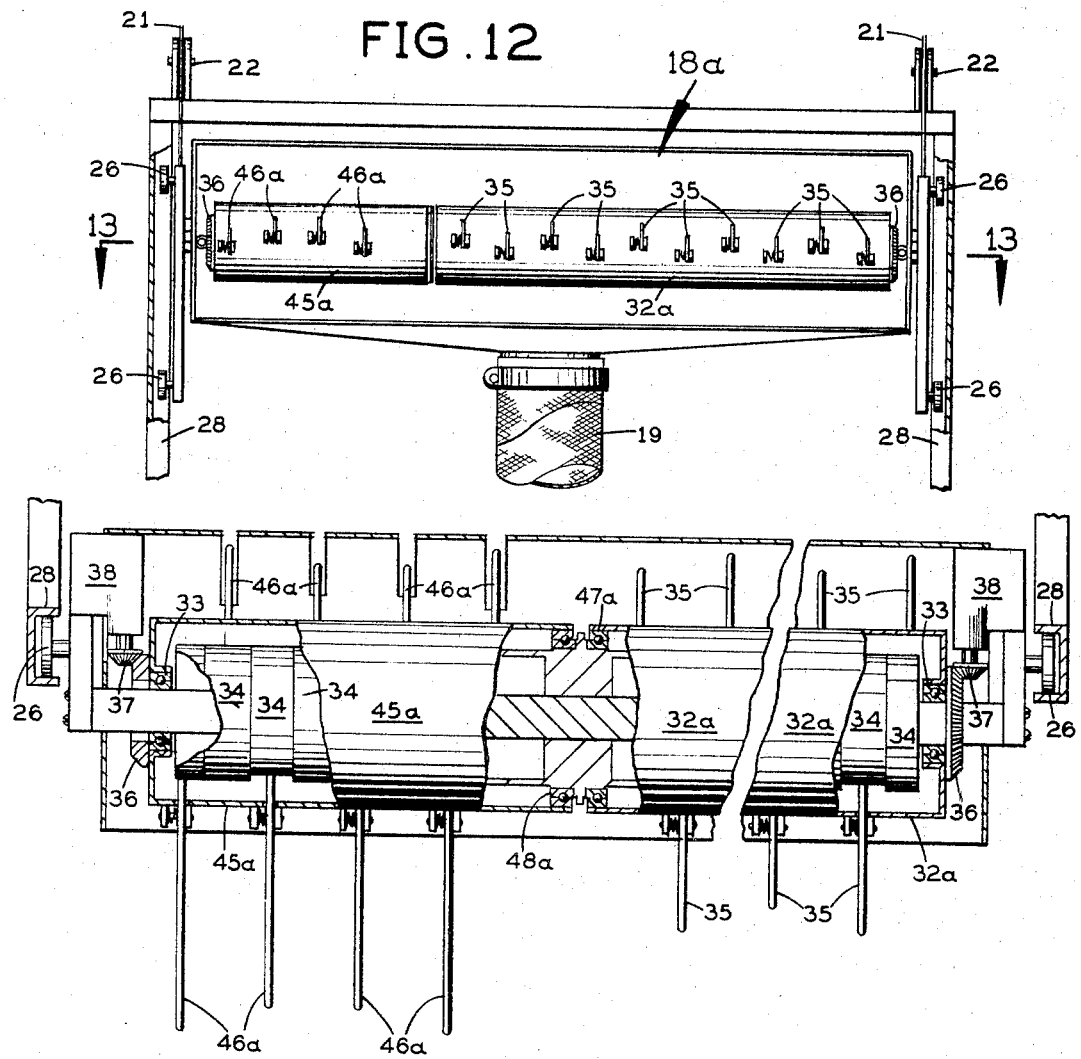

United States Patent Office 3,404,521
Patented Oct. 8, 1968

3,404,521
FRUIT HARVESTING APPARATUS
Roy B. Thorn, P.O. Box 711, Inverness, Fla. 32650, and Jack L. Gray, 2820 NE. 16th St., Pompano Beach, Fla. 33062
Filed June 16, 1966, Ser. No. 563,004
11 Claims. (Cl. 56—328)

This invention relates in general to fruit harvesting machines and more particularly to a manually controlled machine particularly adapted to pick citrus fruits from orchard trees.

A solution of the problem of producing a reliable and effective fruit picking machine has long been sought by the citrus industry. Prior fruit picking machines fell in two principal classes: one, a power driven means for shaking the tree or branches thereof and dislodging the fruit into prepositioned collectors for transfer into portable containers, and two, a manually controllable means for positioning a power driven picking head in selected predetermined positions about the tree, for engaging the fruit by means of rollers, tines, or other devices and dislodging same from the branches for transfer by conveyor or gravity means into containers.

The former "shaker" type of picker is unsatisfactory due to its necessary violent operation, resulting in damage to the fruit, the tree and the branches thereof.

The latter are unsatisfactory for the reason that the construction and operation of prior picking heads frequently damaged the fruit and the fragile branches of the tree, particularly when engaging fruit of substantially different diameters.

The present invention is generally of the aforesaid second type with an improved picking head which overcomes the above objections and disadvantages to a large degree by the provision of a means for selectively positioning an effective power driven head in which a plurality of fingers are caused to oscillate while rotating for gently dislodging the fruit from their twigs and moving same into and through a hopper including means for gravity conveying the fruit into a portable container, which construction is a principal object of the invention.

Another object of the invention is the provision of a power driven fruit picking head having a rotary drum from which a plurality of rows of picking fingers project in spaced relation along the length thereof which are adapted to oscillate normal to the axis of rotation of the drum for engaging and rotating and picking fruit encountered and moving same into a collection hopper for gravity conveyance.

Another object of the invention is the provision of a elevator means for the power raising and lowering of the picking head in a vertical direction adjacent the tree including an attachment to a tractor for moving the elevator means simultaneously in both azimuthal and vertical directions for engaging the head with irregularly positioned fruit on a tree.

Another object of the invention is the provision of a power driven elevator means for simultaneously and selectively positioning a power driven picking head vertically and horizontally for engaging the fruit on a tree including a pivotal means about a vertical axis for moving the head into a selected azimuthal position for engagement of irregularly positioned fruit on a tree.

These and other objects and advantages in two embodiments of the invention are shown and described in the following specification and drawings, in which:

FIG. 1 is a side elevation of the complete fruit picking machine operatively attached to a tractor, in reduced scale.

FIG. 2 is a front view thereof.

FIG. 3 is a fragmentary top plan view of elements shown in FIGS. 1 and 2.

FIG. 4 is a fragmentary enlarged cross sectional elevation taken through section line 4—4, FIG. 2, showing the picking head of the machine in an operating position.

FIG. 5 is a fragmentary front view of the picking head shown in FIG. 4.

FIG. 6 is an enlarged fragmentary cross sectional view taken through section line 6—6, FIG. 5.

FIG. 7 is a fragmentary right side view of the head shown in FIG. 6 with portions thereof broken away.

FIG. 10 is the same as FIG. 8 in changed position.

FIG. 11 illustrates the picking machine in its highest elevated position.

FIG. 12 is a fragmentary front elevation of a picking head alternate to that shown in FIG. 5.

FIG. 13 is an enlarged cross sectional view taken through section line 13—13, FIG. 12.

Figure 8:
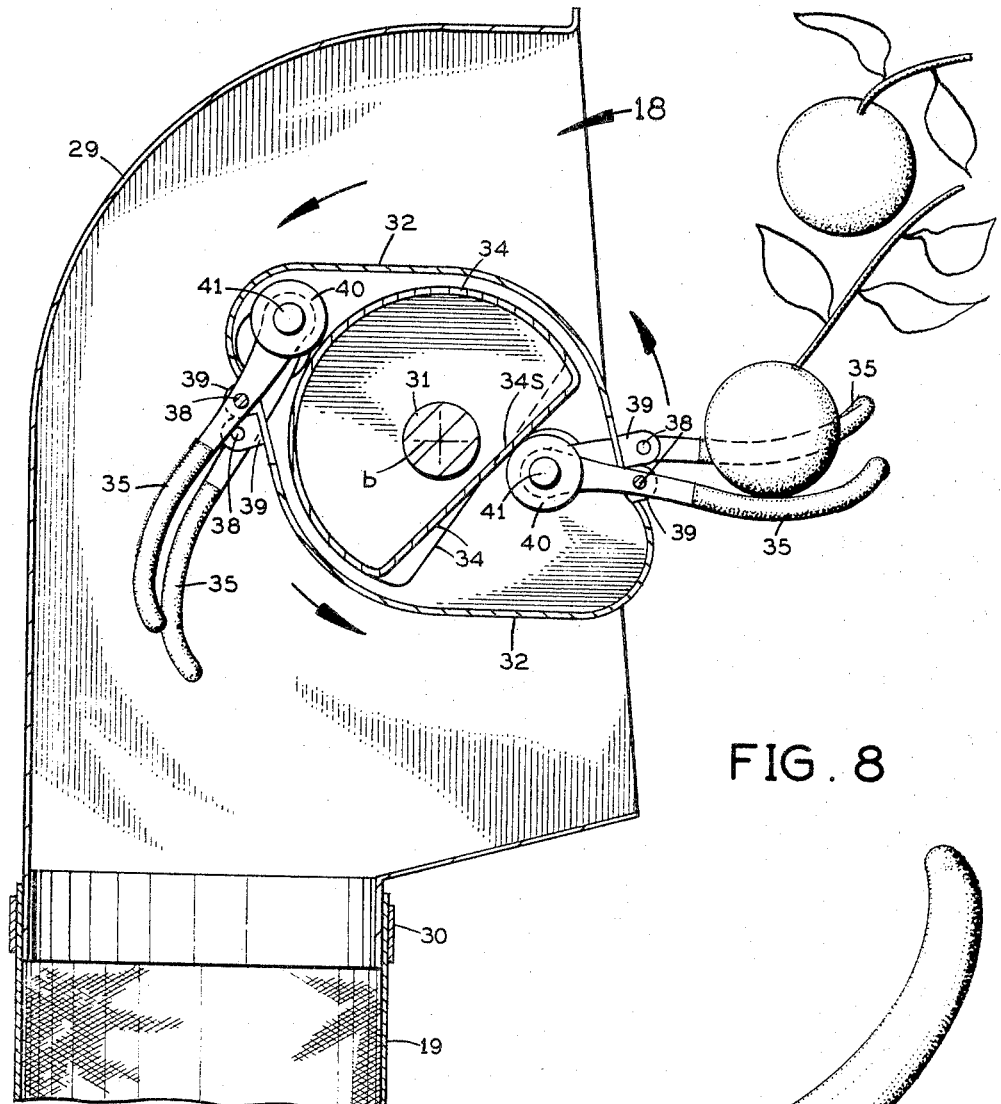
FIG. 8 is an enlarged cross sectional view taken through section line 8—8, FIG. 5.

The automatic fruit picking apparatus to be hereinafter described is shown attached to a conventional tractor 1, however the picking apparatus may be applied to other forms of power driven vehicles.

The picking apparatus in this embodiment is driven by hydraulic means, which power source is readily available on most tractors for the operation of well known accessories therefor.

Referring to FIGS. 1 and 2, the tractor 1 is provided with a front platform 2 which is coupled to the tractor by two pairs of parallel link bars 3, with each pair thereof pivoted on opposite sides of the rear portion of the tractor by suitable bearings 4, as shown. The platform 2 is pivoted to the front end of each pair of bars 3 by bearings 5. A hydraulic cylinder 6 is secured to each upper bar 3 by a stud 7 with the opposite end of each cylinder pivotally secured to each side of the tractor by a stud 8, as illustrated on the right side of FIG. 1. Thus it is apparent that when the cylinders 6 are energized the platform 2 will be raised through a vertical arc to a selected position. An azimuthal body member 9 is pivotally secured to the base 2 for rotation about an axis $a$ and an elevator frame assembly 10, of conventional construction, is retained on a vertical support 11 of member 9 by three links 12 pivotally secured to the frame by studs 13 and to support 11 by studs 14. A hydraulic cylinder 15 is connected between the upper end of member 9 and the central link 12, as shown, which is positioned to raise the elevator frame assembly in a forward upward arc to a selected position when energized, with respect to the member 9 while maintaining the same vertical attitude of the elevator assembly. The tractor is equipped with a group of hydraulic control levers 16 convenient to the operator for controlling all movements of the apparatus. The tractor may be also equipped with a box trailer assembly 17 for receiving and transporting the picked fruit.

A picking head assembly 18, to be hereinafter described, is retained for vertical movement in elevator assembly 10, having the outlet thereof connected to a conduit 19 for the gravity movement of the picked fruit from the head assembly directly into the box trailer assembly 17 or other conventional container.

FIG. 2 shows the picking head assembly 18 in the uppermost position with respect to the elevator assembly 10, and FIG. 3 is a top view of the picking head assembly and associated elements illustrating its range of azimuthal movement of 180 degrees about an axis $a$.

FIGS. 4 and 5 show the means for vertically raising and lowering the picking head in the front side of the elevator frame assembly 10, which is accomplished by a pair of like chains 20 engaged with a pair of sprockets 21 journalled on the upper end of the frame on axles 22. The chains are also engaged with like pair of sprockets 23 secured to a common transverse shaft 24 at the lower end of the frame which is driven by a reversible hydraulic motor 25 with the opposite ends of the chains secured to the head assembly 18, as shown, thus providing for a hydraulic power means for raising and lowering the head to a selected position by energizing the motor 24 in the desired direction for predetermined duration.

The head assembly 18 is guided in its vertical movement by the engagement of a pair of rollers 26 journalled on each opposite sides of the head on bars 27 secured thereto. Each pair of rollers is retained for free movement within U-shaped tracks 28 which form two vertical members of the frame assembly 10, as shown in FIG. 5.

As previously described, and referring to FIG. 4, the elevator frame assembly 10 is pivotally retained to links 12 which in turn are pivotally secured to support 11 forming a parallelogram means for raising and lowering the entire elevator assembly in a vertical arc by the selective operation of a double acting hydraulic cylinder 15 which movement is illustrated by the small displacement of the frame assembly 10 in FIG. 4.

The picking head assembly, shown in FIGS. 5 and 6, consists of a casing 29 having an open front and downwardly convergent to a central outlet collar 30 to which is clamped a flexible tubular conduit 19, which may include a well known accordion section for varying the length thereof.

A main shaft 31 is retained in casing 29 and well known means and serves as a fixed axle for a hollow drum 32 which is journalled for rotation thereon by bearings 33, as shown in FIG. 6. A plurality of cams 34 are secured adjacent to each other in fixed relation on shaft 31 and will be hereinafter described in detail. The rotatable drum has projecting therefrom a plurality of picking fingers 35 pivoted for movement in staggered uniform spaced relation, as shown.

Referring to FIGS. 6 and 7, the drum 32 has secured on one end thereof a miter gear 36 which is engaged with a miter pinion 37 which is driven by a uni-directional hydraulic gear motor 38 which is secured in casing 29 for rotating the drum and fingers 35 in the direction shown by arrows in FIG. 7.

Figure 9:
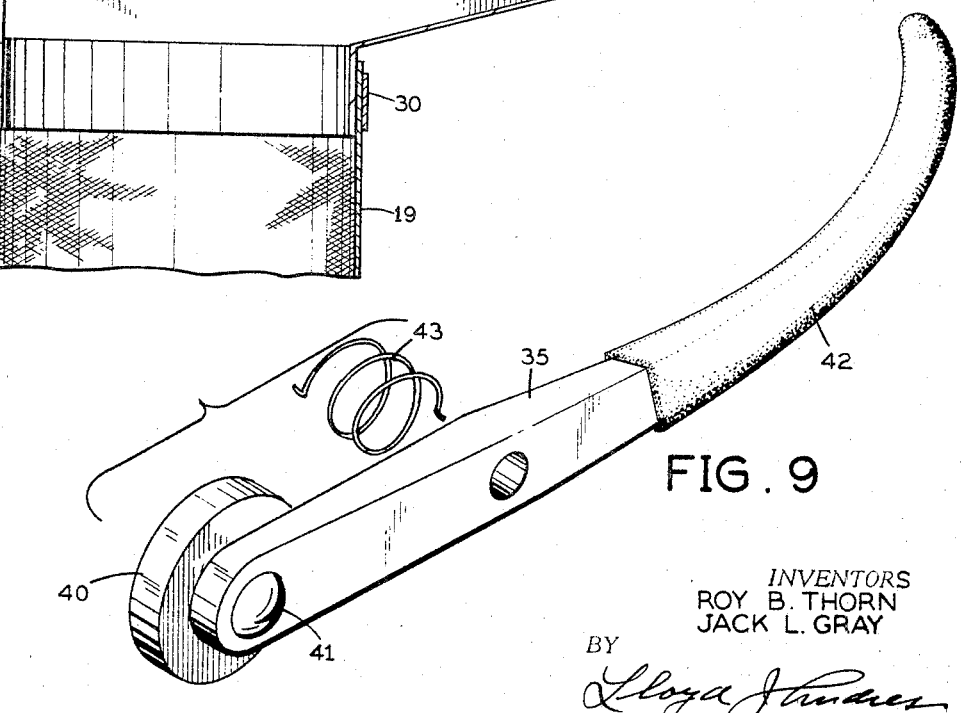
FIG. 9 is an enlarged exploded perspective view of elements shown in FIGS. 6 and 8.

Referring to FIGS. 8 and 9, each picking finger 35 is pivoted for oscillatory movement about a pin 38 which is retained by a clevis 39. The outer end portion of each finger is arcuate in shape, as shown in FIG. 9, and preferably terminates in a spherical surface. The opposite inner end retains a roller 40 journalled on a stud 41 secured in the finger, as shown. The outer arcuate portion of each finger may be coated with a layer of resilient material 42, such as rubber or plastic, for serving dual purposes, which will be hereinafter described.

Each roller of each finger is positioned to be constantly engaged by a fixed cam 34 secured to the shaft by well known means and having a substantially flat side 34s. Since the fingers are in staggered relation along the drum, the flattened sides of the cams are likewise staggered so that every other finger will be delayed for a like predetermined angle during the rotation of the drum 32. A torsion spring 43, better shown in FIG. 9, is positioned around each stud 41 with the opposite ends thereof engaged with each finger 35 and one side of each corresponding clevis 39, respectively, for independently urging each roller 40 into contact with the periphery of each corresponding cam 34. It is now apparent that when the drum 32 is rotated in the direction of the arrow in FIG. 8 about the axis b each finger will oscillate from the idle position shown by the left hand finger to the extended picking position shown by the right hand finger. Since each cam 34 is alternately staggered, it is obvious that each finger in each row will alternately oscillate with respect to each adjacent finger for an important reason to be hereinafter described.

Referring to FIGS. 1 and 2, the azimuthal member 9 which supports the elevator frame assembly 10 is pivoted to frame 2 for rotation about axis a, by suitable thrust bearing means, not shown. The rotation is illustrated in FIG. 3 and accomplished by a reversible hydraulic gear motor 44 secured to platform 2 and coupled by a conventional gear transmission to the base of member 9. Thus by energizing the gear motor 44 for rotation in a predetermined direction for a predetermined duration, the picking head assembly 18 may be positioned in an infinite number of positions within the 180 degrees of rotation about axis a.

In operation and referring to FIGS. 8, 9, and 10 and under the assumption that the hydraulic gear motor 38 is energized, then the drum 32, shown in FIG. 8, will rotate in the direction shown by arrow and when each roller 40 engages the flat side of its corresponding cam 34 the finger will extend outward, as shown, for engaging the fruit retained on the tree. As the rotation of the drum continues, each finger in contact with a single piece of fruit will simultaneously tend to rotate and raise same from its suspended position and break the stem thereof and move same along the upper surface of the drum, as shown in FIG. 10, by the retracting action of the finger. The fruit will follow the outer surface of the drum until moved to a position for gravity descent in the casing 29 where it will further gravitate through collar 30 into flexible conduit 19 for delivery to a portable container.

It has been found that a satisfactory speed for the rotation of the drum 32 is in the order of fifty revolutions per minute. Although the outer portions of fingers 35 should be smooth for picking normal fruit the speed of the drum may be increased with less likelihood of bruising by coating the finger with a layer of rubber or resilient plastic material 42, as previously mentioned. This coating not only minimizes bruising but its higher co-efficient of friction results in better rotation of each fruit by the finger for the release from its stem. It is to be noted that the staggered relation of each row of fingers facilitates the rotation of each fruit encountered because of the relative delayed movement between adjacent fingers.

Thus it is apparent that when the head is moved into the position for engaging the fruit on a tree, all the fruit clusters adjacent the rotating fingers will be engaged and picked from the stems and permitted to gravitate from the casing 29 into a container.

The hydraulic system and circuitry therefor under the control of levers 16 for the precise operation of the hydraulic cylinders 6 and 15 and gear motors 25, 38 and 44 from a power source in the tractor are well known in the art and not shown in detail.

It is also apparent that the substitution of remote controlled electric motors may be substituted for part or all of the hydraulic units and retain satisfactory performance of the machine.

Since the fruit to be picked is positioned on all sides of the tree the accurate mobility and precise positioning of the picking head is of great importance.

Referring to FIG. 1, under average tree conditions, the tractor is moved into close proximity of the tree to be picked and the elevator assembly 10 positioned in its lowermost position, as shown, and the hydraulic motor in the picking head energized for rotating the drum and fingers shown in FIGS. 5 and 8. Then the picking head 18 is moved from its lowermost position shown in dotted lines to its uppermost position, as required to encounter and pick the fruit from the branches of the tree. The near side portions of the tree may be picked by rotating the elevator assembly 10 and assembly 18 about axis a, illustrated in FIG. 3, by selectively energizing gear motor 44 to conform with the azimuthal contour of the tree, which movement may require a corresponding change in the position of the tractor.

When exceedingly high trees are encountered, the elevator assembly and picking head may both be raised, as illustrated in FIG. 11, by selectively energizing the cylinder 15 and positioning the picking head, the elevator frame and the azimuthal member in the manner previously described.

It is also apparent that the conduit 19 will gravitate the picked fruit in a portable container other than that shown or into a separate vehicle for transport.

It has been found that fruit within the branches of certain trees are not readily reached and picked with the fingers 35 of normal length. Therefore, an alternate interchangeable form of picking head 18a is shown in FIGS. 12 and 13 in which a drum 32a therein is identical to that previously described except having reduced length, and a second drum 45a having a relatively small number of fingers 46a, which are the same as shown in FIG. 9, except having considerably longer outer picking portions. The casing 47a may be increased in diameter around the longer fingers or slotted as shown to provide free movement of longer fingers through the casing.

The alternate drum 45a is shown driven by a second hydraulic gear motor 38 which can be remote controlled by means of an additional lever in the group of levers 16 on the tractor by hydraulic means, not shown. It is also apparent that a hydraulic controlled conventional clutch means may be adapted to couple and de-couple drum 45a with the drum 32, as desired, as a substitute for the second gear motor 38.

In operation the longer fingers may be moved deeper into the branches of the tree for picking fruit out of reach of the fingers 35 which fruit will be carried into the casing by the drum for gravity descent, as previously described.

Having described our invention, we claim:

1. A picking head for a fruit picking machine for picking fruit from stems of trees comprising a hollow casing means having an open front side with its opposite ends spaced a predetermined distance including an orifice in the bottom thereof for conducting gravity propelled fruit released in said casing in a downward linear path.
   an elongated fixed cam means secured in said casing along a transverse axis which intersects each of said ends in like predetermined location,
   an elongated hollow drum means of uniform cross section coaxially positioned around said cam means in said casing and journalled at opposite ends thereof for rotation about said axis,
   motor means coupled to said drum means for rotating same when energized,
   a row of elongated picking fingers pivotally secured in spaced relation along one side of said drum means with each one thereof pivoted for oscillation in a plane normal said axis,
   each of said fingers having the inner portion thereof extending through said drum means into follower engagement with said cam means with the outer end portion of each of said fingers projecting from said drum means for oscillatory movement from a retracted position tilted toward said drum means when within said casing to an extended position when traversing the said open front side in an upward direction when said drum means is rotated in predetermined direction whereby said row of fingers in their said extended position will engage fruit on said tree and dislodge same from their stems and be carried over said drum means for descent in the rear of said casing and into said orifice when said motor means is energized.

2. The construction recited in claim 1 including a gear train means coupled between said motor means and said drum means for rotating the latter when said motor means is energized.

3. The construction recited in claim 1 including an anti-friction roller means journalled on the end of said inner portion of each of said fingers for follower engagement with said cam means.

4. The construction recited in claim 1 with said outer end portion of each of said fingers formed in predetermined arcuate shape and coated with a layer of resilient material for engaging and imparting rotation and picking said fruit from said stems when said picking fingers are moved in an upward arcuate direction into engagement with said fruit on said tree.

5. The construction recited in claim 1 including a second row of elongated picking fingers pivotally secured in spaced relation along the side of said drum means opposite said first mentioned row with each one thereof pivoted for oscillation in a plane normal said axis,
   each of said fingers having the inner portion thereof extending through said drum means into follower engagement with said cam means with the outer end portion of each of said fingers projecting from said drum means for oscillatory movement from a retracted position tilted toward said drum means when within said casing to an extended position when traversing the said open front side in an upward direction when said drum means is rotated in predetermined direction whereby each said row of fingers in their said extended position will sequentially engage fruit on said tree and dislodge same from their stems and be carried over said drum means for descent in the rear of said casing and into said orifice when said motor means is energized.

6. The construction recited in claim 1 wherein each adjacent one of said picking fingers are alternately displaced a predetermined radial angle with respect to said axis forming a said row with the said fingers in staggered relation for rotating said fruit when picked.

7. The construction recited in claim 1 including a portable container means,
   a flexible conduit means of predetermined length connected to said orifice for conducting said picked fruit in a predetermined linear path from said head into said container.

8. A picking head for a fruit picking machine for picking fruit from stems of trees comprising a hollow casing means having an open front side with its opposite ends spaced a predetermined distance including an orifice in the bottom thereof for conducting gravity propelled fruit released in said casing in a downward linear path,
   an elongated fixed cam means secured in said casing along a transverse axis which intersects each of said ends in like predetermined location,
   a first elongated hollow drum means of uniform cross section coaxially positioned around said cam means in said casing and journalled at opposite ends thereof for rotation about said axis,
   a first motor means coupled to said drum means for rotating same when energized,
   a first row of elongated picking fingers pivotally secured in spaced relation along one side of said first drum means with each one thereof pivoted for oscillation in a plane normal to said axis,
   a second elongated hollow drum means of uniform cross section positioned around said cam means coaxial with and adjacent said first drum means and journalled at opposite ends thereof for rotation about said axis,
   a second motor means coupled to said second drum means for rotating same when energized,
   a second row of elongated picking fingers pivotally secured in spaced relation along one side of said second drum means with each one thereof pivoted for oscillation in a plane normal said axis,
   each of said second fingers having an inner portion thereof extending through said drum means into follower engagement with said cam means with the outer end portion of each of said second fingers projecting a predetermined distance greater than said first fingers from said second drum means, each of said first and said second fingers projecting from said first and second drum means respectively and having oscillatory movement from a retracted position titled toward said drum means when within said casing to an extended position when traversing the said open front side in an upward direction when both said drum means are rotated in like predetermined direction whereby each row of first fingers will sequentially engage the outer fruit on said tree and dislodge same from their stems and be carried over said first drum means for descent in the rear of said casing into said orifice when said first motor means is energized and whereby said row of said second fingers in their said extended position will sequentially engage fruit on said tree beyond the range of said first fingers and dislodge same from the stems and be carried over said second drum means for descent in the rear of said casing and into said orifice when said second motor is energized.

9. A picking head for a fruit picking machine for picking fruit from stems of trees comprising a hollow casing means having an open front side with its opposite ends spaced a predetermined distance including an orifice in the bottom thereof for conducting gravity propelled fruit released in said casing in a downward linear path, an elongated fixed cam means secured in said casing along a transverse axis which intersects each of said ends in like predetermined location, a first elongated hollow drum means of uniform cross section coaxially positioned around said cam means in said casing and journalled at opposite ends thereof for rotation about said axis, motor means coupled to said drum means for rotating same when energized, a first row of elongated picking fingers pivotally secured in spaced relation along one side of said first drum means with each one thereof pivoted from oscillation in a plane normal to said axis, a second elongated hollow drum means of uniform cross section coaxially positioned around said cam means coaxial with and adjacent said first drum means and journalled at opposite ends thereof for rotation about said axis, a clutch means positioned and adapted and constructed to connect said first and said second drum means for simultaneous operation when operated, a second row of elongated picking fingers pivotally secured in spaced relation along one side of said second drum means with each one thereof pivoted for oscillation in a plane normal said axis, each of said second fingers having an inner portion thereof extending through said drum means into follower engagement with said cam means with the outer end portion of each of said second fingers projecting a predetermined distance greater than said first fingers from said second drum means, each of said first and said second fingers projecting from said first and second drum means respectively and having oscillatory movement from a retracted position tilted toward their respective said drum means when within said casing to an extended position when traversing the said open front side in an upward direction when both said drum means are rotated in like predetermined direction whereby each row of said first fingers will sequentially engage the outer fruit on said tree and dislodge same from said stems and be carried over said first drum means for descent in the rear of said casing into said orifice when said motor means is energized and whereby said row of said second fingers in their said extended position will sequentially engage fruit on said tree beyond the range of said first fingers and dislodge same from said stems and be carried over said second drum means for descent in said casing and into said orifice when said clutch means is operated.

10. A fruit picking machine comprising a power operated vehicle for movement into near proximity of a fruit bearing tree, a substantially horizontal platform means operatively secured to said vehicle by pivotal bar means for moving said platform means within a predetermined vertical first angle with said platform means in a substantially fixed horizontal attitude, a first power means connected to said vehicle and said bar means for positioning said platform means in a selected predetermined vertical position within said first angle when selectively operated, a body member journalled for rotation on said platform about a vertical axis for rotation within a predetermined azimuthal angle, a second power means for rotating said body member to a selected position within said azimuthal angle when selectively operated, a substantially vertical elevator frame pivotally secured to said body member by pivotal parallelogram link means for movement through a predetermined second vertical angle, a third power means connected between said body member and said frame for moving the latter to a selected vertical position within said third angle when selectively operated, a picking head as set forth in claim 1 having power driven finger elements for picking fruit from the stems of a tree when engaged therewith when energized including an outlet orifice for gravitating the said picked fruit in a downward linear path, carriage means on said picking head engaged in said frame for vertical movement from a lower to an upper position, a fourth power means for positioning said carriage means and said picking head in a selected position between said upper and lower positions in said frame when selectively operated whereby the picking head will be sequentially moved into any portion of a tree for engaging and picking fruit from the stems thereof and gravitating said fruit in a linear path when all of said power means are individually and selectively operated and said picking head is energized.

11. A fruit picking machine comprising a power operated vehicle for movement into near proximity of a fruit bearing tree, a substantially horizontal platform means operatively secured to said vehicle by pivotal bar means adapted and constructed to move said platform means within a predetermined vertical first angle with said platform means in a substantially fixed horizontal attitude, a first hydraulic power means connected to said vehicle and said bar means for positioning said platform means in a selected predetermined vertical position within said first angle when selectively energized, a body member journalled for rotation on said platform about a vertical axis for rotation within a predetermined azimuthal angle, a second hydraulic power means for rotating said body member to a selected position within said azimuthal angle when selectively energized, a substantially vertical elevator frame pivotally secured to said body member by pivotal parallelogram link means for movement through a predetermined second vertical angle, a third hydraulic power means connected between said body member and said frame for moving the latter to a selected vertical position within said third angle when selectively energized, a picking head as set forth in claim 1 having a fourth hydraulic power means for driving a plurality of finger elements for picking fruit from the stems of a tree when engaged therewith when energized including an outlet orifice for gravitating the said picked fruit in a downward linear path, carriage means on said picking head engaged in said frame for vertical movement from a lower to an upper position, a fifth hydraulic power means for positioning said carriage means and said picking head in a selected position between said upper and lower positions in said frame when selectively energized, a source of hydraulic energy, a manual selective hydraulic multicontrol valve means, hydraulic circuit means connecting all of said hydraulic power means and said source of hydraulic energy and said valve means whereby the selective manual operation of said multicontrol valve means will selectively move said picking head into any portion of a tree for engaging and picking fruit from the stems thereof and gravitating said picked fruit in a linear path from said orifice.

References Cited

UNITED STATES PATENTS

| | | | |
|---|---|---|---|
| 2,388,212 | 10/1945 | McElhoe et al. | 56—364 |
| 2,644,292 | 7/1953 | Oberholtz et al. | 56—364 |
| 2,674,500 | 4/1954 | Hukari | 304—29 |
| 2,696,706 | 12/1954 | Getsinger | 56—330 |
| 2,872,772 | 2/1959 | Nolt | 56—364 |
| 2,953,229 | 9/1960 | Wiegel | 193—7 |
| 2,970,423 | 2/1961 | Wenzel | 56—341 |
| 3,077,720 | 2/1963 | Grove et al. | 56—328 |
| 3,127,725 | 4/1964 | Richardson | 56—328 |
| 3,200,575 | 8/1965 | Hurst | 56—328 |

ALDRICH F. MEDBERY, *Primary Examiner.*